United States Patent [19]

Giacometti

[11] Patent Number: 5,509,454
[45] Date of Patent: Apr. 23, 1996

[54] WORKPIECE TRIMMERS

[76] Inventor: Massimo A. Giacometti, Via Resegone 39, Valmadrera (Como) 22049, Italy

[21] Appl. No.: 397,442

[22] Filed: Mar. 2, 1995

[30] Foreign Application Priority Data

Mar. 2, 1994 [GB] United Kingdom ............... 9403997

[51] Int. Cl.$^6$ ............................. B23C 9/00; B27G 19/00
[52] U.S. Cl. ................................. 144/252 R; 144/134 D; 409/137; 409/182
[58] Field of Search ........................ 144/134 R, 134 D, 144/136 C, 251 R, 252 R, 252 A, 251 A; 409/137, 182

[56] References Cited

U.S. PATENT DOCUMENTS

| 3,022,806 | 2/1962 | Johnston . |
| 4,088,164 | 5/1978 | McCord, Jr. . |
| 4,253,362 | 3/1981 | Olson ................................. 144/252 R |
| 4,409,699 | 10/1983 | Moorhouse ........................ 144/252 R |
| 4,613,261 | 9/1986 | Maier et al. . |
| 4,674,548 | 6/1987 | Mills et al. . |
| 4,821,365 | 4/1989 | Charters . |
| 4,926,916 | 5/1990 | Legler et al. . |
| 5,004,027 | 4/1991 | Legler et al. . |
| 5,031,678 | 7/1991 | Remmele et al. . |
| 5,176,478 | 1/1993 | Munch . |

FOREIGN PATENT DOCUMENTS 2070493  9/1981  United Kingdom .
2219535  12/1989  United Kingdom .

Primary Examiner—W. Donald Bray
Attorney, Agent, or Firm—Dennis A. Dearing; John D. Del Ponti; J. Bruce Hoofnagle

[57] ABSTRACT

A workpiece trimmer power tool (eg. a laminate trimmer 10) has a waste collector attachment (26) for collecting dust and other waste material generated by the trimmer in use. The attachment can be fitted in a first position (FIG. 2) adjacent to an edge of the trimmer base (12) adapted for trimming a workpiece face, or in a second position (FIG. 5) adjacent to the underside of the trimmer base (12) adapted for trimming an edge surface of a workpiece. The attachment (26) provides a handle surface, also a guard surface and a fence surface for controlling edge trimming. Skis can be attached to the trimmer base (12) for face trimming.

17 Claims, 3 Drawing Sheets

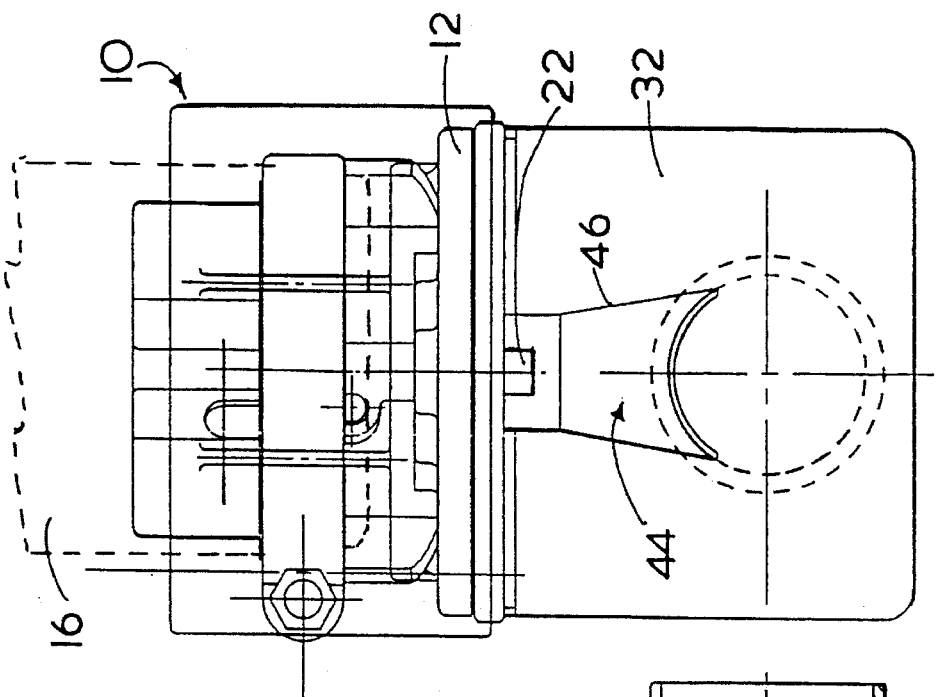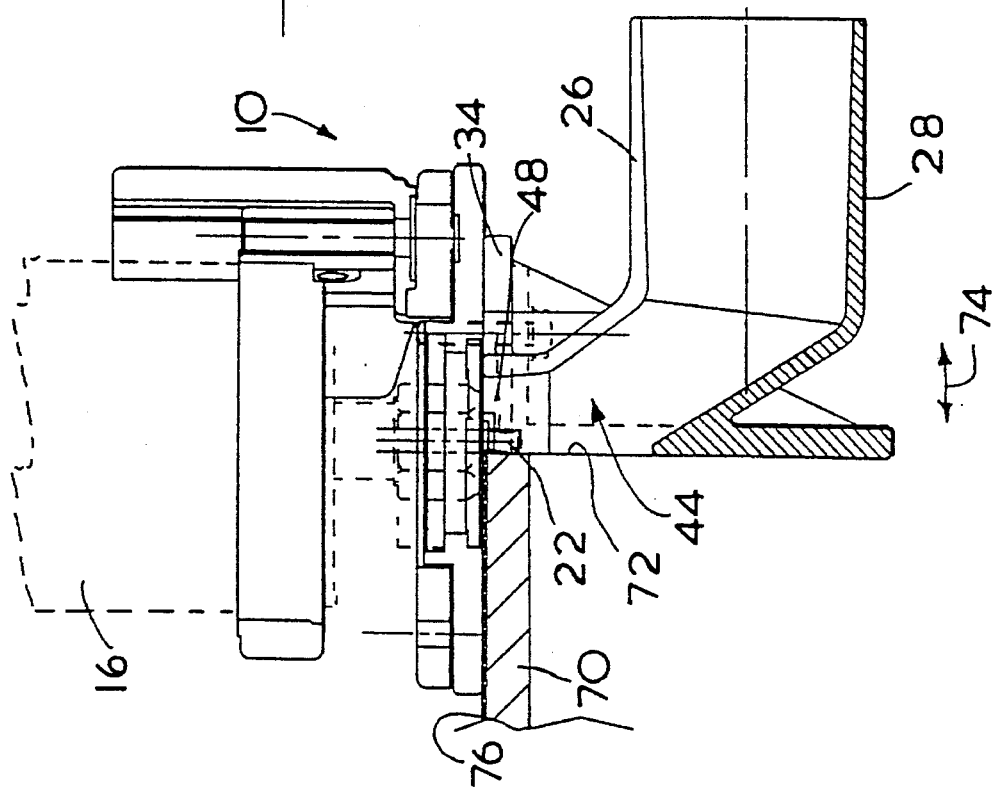

WORKPIECE TRIMMERS

This invention relates to workpiece trimmers. In particular it relates to trimmer power tools, such as laminate trimmers. Such trimmers conventionally comprise a base supporting a power unit (e.g. an electric motor). The motor drives an abrasive bit which projects through the base.

According to a first aspect of the invention, a workpiece trimmer power tool includes collector means for collecting waste material generated by the trimmer in use.

Such a feature can be of particular advantage in collecting the dust which is generated inevitably by the trimmer when in use on a workpiece. With conventional trimmers which do not include such collecting means, the dust is left as waste material on or around the workpiece, and has to be tidied later The tool may comprises a base, and the collector means be positioned, or be positionable, adjacent to a side of the base to permit the tool to be used against a face of a said workpiece for trimming the face. The tool may also include means, such as skis, for elevating the base above the level of a said face of a said workpiece to provide a passage for collecting the waste material. Such means may be removably attachable to the tool.

Preferably, adjustable locating means are provided for enabling the position of the collector means relative to the base to be adjusted to suit the nature of a said face of a said workpiece on which the tool is to be used.

Alternatively, or additionally, the collector means may be positioned or be positionable adjacent to the underside of the base, to permit the tool to be used at an edge surface of a said workpiece for trimming the edge surface. Preferably, the collector means comprises a fence portion for guiding the position of the tool relative to a said edge surface of a said workpiece. Adjustable locating means may be provided for enabling the position of the collector means on the underside of the base to be adjusted in order to set the position of the fence.

Preferably, the collector means comprises a shroud portion positioned relative to the underside of the base which acts as a guard for a cutting or abrasive element of the tool.

In the preferred embodiment, the collector means is selectively positionable in either a first position relative to the base in which the tool is adapted for use against a face of a said workpiece, or a second position relative to the base in which the tool is adapted for use against an edge surface of a said workpiece.

Preferably, the collector means is removably attachable to the tool. Preferably, the collector means provides a handle surface of the tool.

The collector means may also comprise extractor means, such as a suction device, for extracting the waste material from a said workpiece surface.

In a second closely related aspect, the invention relates to a removable waste collector adapted for use with a workpiece trimmer power tool for collecting waste material generated by the tool in use. The waste collector comprises a base portion with a collection opening therein, securing means by which the waste collector can be releasably secured to a said tool, and a collection tube communicating with the opening in the base.

Preferably, the tube and the base together define an open channel at a portion where the tube meets the base. The channel may have an open end at an edge of the base.

An embodiment of the invention is now described by way of example, with reference to the accompanying drawings, in which:

FIG. 5 is a schematic sectional view through a side of the laminate trimmer with the dust collector shown in a second operating position; and FIG. 6 is a front view of the trimmer shown in FIG. 5.

Figure 1:
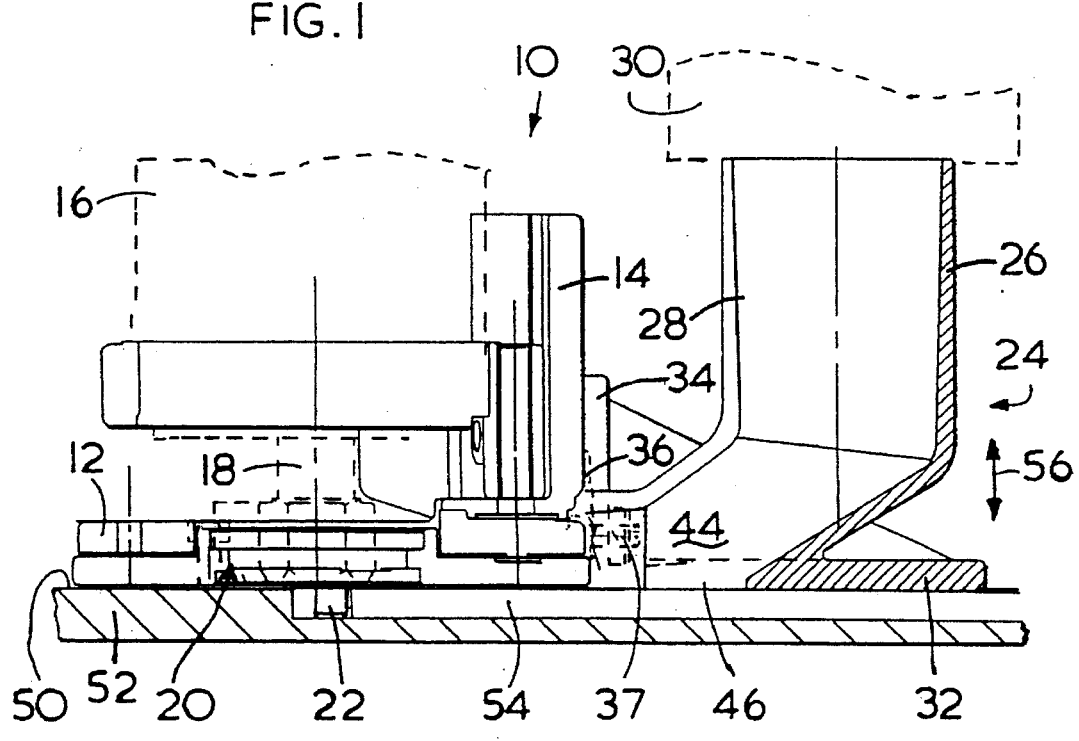
FIG. 1 is a schematic sectional view through a side of a laminate trimmer including a dust collector shown in a first operating position.

Referring to the drawings, a laminate trimmer 10 comprises a base casting 12 which includes a support upright 14 for supporting an electric motor power unit 16. A drive spindle 18 projects from the power unit 16 through an opening 20 in the base 12, and an abrasive cutting bit 22 is removably carried at the projecting end of the drive spindle 18. The support 14 is adjustable to enable a user to adjust the "height" of the power unit 16 above the base 12, which in turn determines the cutting depth of the abrasive bit 22 relative to the underside of the base 12.

In this exemplary embodiment, a dust or waste collector 24 is provided for collecting dust and other waste material produced when the trimmer 10 is used on a workpiece. The collector 24 consists of an attachment 26 with an integral collector tube 28. A suction device 30 is attachable to the tube 28 for drawing the dust away from the workpiece and into a collector chamber (for example a dust bag) within the suction device 30.

The suction device 30 may be any suitable device, such as a vacuum pump, and may be driven independently of the power unit 16. Alternatively, it may be coupled to the power unit 16 for operation when the power unit 16 is activated.

The attachment 26 has a base 32 from one edge of which upstand a pair of integral brackets 34. Each bracket 34 includes a slot 36 for receiving a fixing (such as a respective securing bolt 37) to enable the attachment to be secured to the trimmer 10. Each bracket 34 is buttressed by a triangular wall 38 extending to the base 32. The integral tube 28 has two bends 40 and 42 such that overall the tube 28 is angled through about 90° to extend away from the base 32. Where the tube 28 meets the base 32, an open tunnel or channel 44 is formed in the base 32 with an open side 46. The tunnel 44 ends as an open mouth or end 48 substantially co-extensive with the base and lying in a plane substantially perpendicular to the base 32 (and parallel with the upstanding brackets 34).

FIG. 1 illustrates a first operating position of the attachment 26 relative to the trimmer 10. In this position, the trimmer 10 is adapted for use on a flat face 50 of a workpiece 52. The attachment 26 is fitted to the trimmer 10 as a rear extension of the trimmer base 12. In use, as the trimmer 10 is advanced along the face 50 in a forward direction, dust generated by the abrasive bit and lying on the face 50 or, for example, in a groove 54 cut by the abrasive bit, is extracted through the open side 46 of the pipe channel 44 in the attachment 26, and into the suction device 30.

The slots 36 in the brackets 34 allow the user to adjust the level of the base 32 of the attachment 26 relative to the trimmer base 12. By loosening the fixing bolt 37, the attachment can be moved in the direction illustrated by the arrow 56.

As well as providing a useful dust collection/extraction feature, the pipe 28 of the attachment 26 also provides a convenient handle surface which a user can grip to enable the trimmer 10 to be guided when in use.

Figure 2:
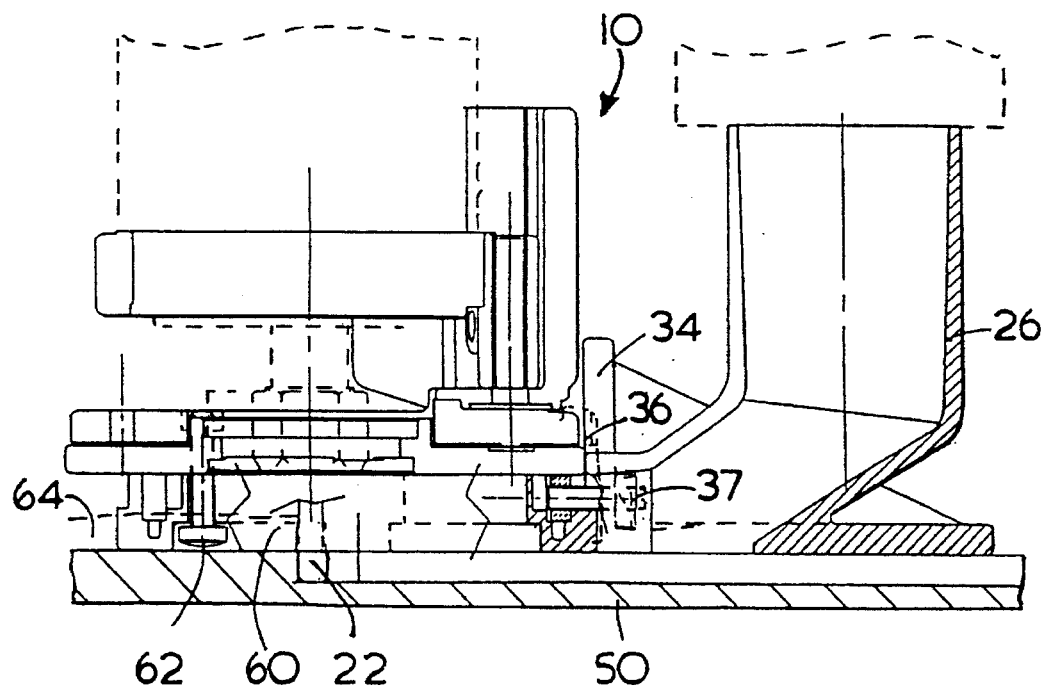
FIG. 2 is a schematic view similar to FIG. 1, but showing the trimmer with skis attached.
Figure 3:
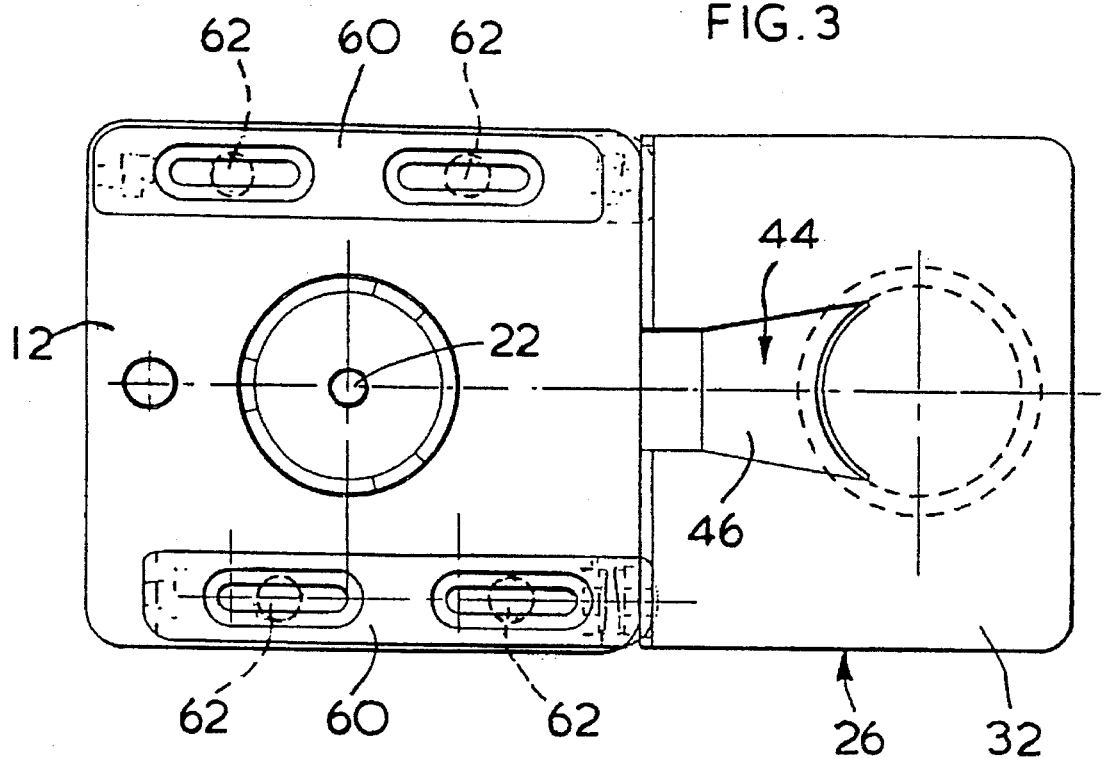
FIG. 3 is an underside plan view of the trimmer in FIG. 2.
Figure 4:
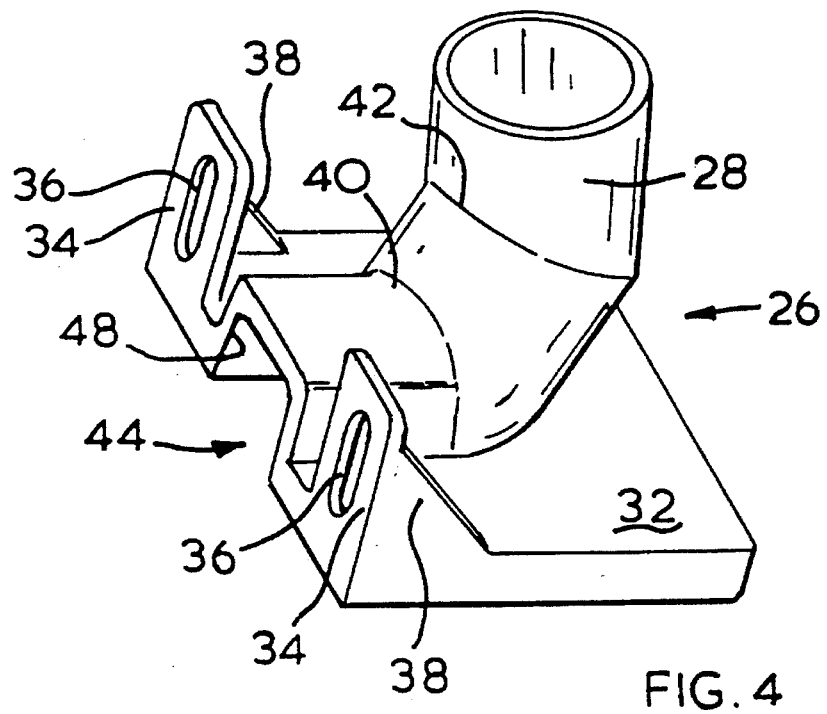
FIG. 4 is a perspective view of the dust collection tube of the trimmer in isolation.

FIG. 2 illustrates a modified configuration of the trimmer 10 in which the trimmer base 12 is raised above the level of the workpiece face 50 by using a pair of support skis 60. Each ski is secured to the underside of the trimmer base 12 by suitable fixings such as fixing bolts 62. The skis fit either side of the abrasive bit 22 to leave a central clearance running from the front of the trimmer base 12 to the rear. Such a configuration is especially useful for working on a workpiece face 50 which has a projecting ridge (illustrated in phantom at 64), to enable trimming work to be carried out on the ridge (64).

In FIG. 2, the attachment 26 is secured to the rear edges of the skis 60. The slots 36 in the brackets 34 enable the level of the base 32 of the attachment 26 to be adjusted relative to the skis 60 and to the trimmer base 12. The appropriate level will depend on whether the workpiece face 50 is flat. In FIG. 2, the attachment 26 is fitted such that its base 32 lies substantially flush with the workpiece face 50. It will be appreciated that dust generated by the trimmer 10 when in use can be sucked up through the open end 47 of the pipe channel 44 as well as through the open side 46. Depending on the level of the attachment 26 relative to the base, the open mouth 48 of the pipe channel 44 will communicate directly with the open region between the skis 60.

As in the configuration in FIG. 1, the pipe 28 also provides a convenient handle to enable a user easily to guide the trimmer 10 when in use.

FIGS. 5 and 6 illustrate a second operating position of the attachment 26 relative to the trimmer 10. In this position, the trimmer 10 is adapted for use at the edge of a workpiece 70, for working on an edge surface 72. The attachment 26 is fitted to the underside of the trimmer base 12 such that the abrasive bit 22 is received in the region of the open end 48 of the pipe runnel 44 of the attachment 26. The base 32 of the attachment 26 extends substantially perpendicularly to the trimmer base 12 to act as an adjustable fence to guide and control the trimmer 10. The slots 36 in the brackets 34 allow the user to adjust the position of the attachment 26 in the direction indicated by arrow 74. It will be appreciated that the position of the base 32 of the attachment 26 relative to the abrasive bit 22 will control the cutting or trimming depth relative to the edge face 72 of the workpiece 70, while the height of the power unit 16 relative to the trimmer base 12 will determine the cutting or trimming depth relative to the upper face 76 of the workpiece. The open end 48 and open side 46 of the pipe runnel 44 of the attachment are dimensioned to avoid interfering with the abrasive bit 22 over the available ranges of cutting or trimming depths. In use, dust generated by the abrasive bit 22 can be extracted through the collecting pipe 28 by the suction device 30. As in the previous configurations, the pipe 28 also provides a convenient handle surface which a user can grip to guide the trimmer 10 when in use.

It will be appreciated that in the position shown in FIGS. 5 and 6, the attachment also acts as a protective guard or shroud covering the abrasive bit 22. The bit 22 is received within the open channel 44 of the attachment 26.

The attachment 26 may be made of any suitable material, for example, of metal or of sufficiently tough plastics.

Although a straight trimmer has been described in the above embodiment, it will be appreciated that the dust collecting attachment 26 could also be used with an offset-base trimmer without requiring substantial modification.

Although in the above embodiment (when used for work on a face of a workpiece without skis) the dust is collected from the face of the workpiece after the abrasive bit of trimmer has passed, it will be appreciated that the dust could also be drawn from the workpiece directly in the region as the cutting bit. For example, a suitable collecting or extraction passage could be formed or through in the trimmer base.

It will be appreciated that the present invention, particularly as exemplified in the preferred embodiment, provides an advantageous dust (or other waste material) collecting feature for a workpiece trimmer power tool. By providing a collector attachment, the collector and trimmer can be user configured either for working on the face of a workpiece, or for working on an edge surface. As well as providing a convenient handle feature, the collector attachment can act as a much needed fence to provide cutting or trimming depth control when used in the edge-trimming configuration.

Although in the preferred embodiment the collector is described in the form of a removably securable attachment, it will be appreciated that a fixed (ie. non-separable) collector may be provided on a trimmer in accordance with this invention.

The foregoing description is merely illustrative of a preferred form of the invention. Modifications may be made without departing from the principles and scope of the invention.

I claim:

1. A workpiece trimmer power tool including collector means for collecting waste material generated by the trimmer tool in use, a base, the collector means is positionable adjacent to a side of the base to permit the tool to be used against a face of a workpiece for trimming the face, and means for elevating the base above the level of the face of the workpiece to provide a passage for collecting the waste material.

2. A tool according to claim 1, wherein the means for elevating the base comprise a pair of skis.

3. A tool according to claim 1, wherein the means for elevating the base are removably attachable to the tool.

4. A workpiece trimmer power tool which comprises collector means for collecting waste material generated by the trimmer tool in use, a base, the collector means is positionable adjacent to a side of the base to permit the tool to be used against a face of a workpiece for trimming the face, and an adjustable locating means for enabling the position of the collector means relative to the base to be adjusted to suit the nature of the face of the workpiece on which the tool is to be used.

5. A workpiece trimmer power tool which comprises a collector means for collecting waste material generated by the trimmer tool in use, a base, and the collector means is positioned or is positionable adjacent to the underside of the base, to permit the tool to be used at an edge surface of a workpiece for trimming the edge surface.

6. A tool according to claim 5, wherein the collector means comprises a portion used as a fence for guiding the portion of the tool relative to the edge surface of the workpiece.

7. A tool according to claim 6, wherein further comprising adjustable locating means for enabling the position of the collector means on the underside of the base to be adjusted in order to set the position of the fence.

8. A tool according to claim 5, wherein the collector means comprises a shroud portion positioned relative to the underside of the base which acts as a guard for a cutting or abrasive element of the tool.

9. A workpiece trimmer power tool including collector means for collecting waste material generated by the trimmer tool in use, a base, and the collector means is selectively positionable in either a first position relative to the base in which the tool is adapted for use against a face of a workpiece, or a second position relative to the base in which the tool is adapted for use against an edge surface of the workpiece.

10. A tool according to claim 1, wherein the collector means is removably attachable to the tool.

11. A tool according to claim 1, wherein the collector means provides a handle surface for the tool.

12. A tool according to claim 1, wherein the collector means comprises means for extracting said waste material from a said workpiece surface.

13. A tool according to claim 12, wherein the extracting means comprises a suction device.

14. A tool according to claim 1, wherein the collector means comprises a waste collection passage, the passage having a collection opening atone end, the collection opening being shaped as an open channel.

15. A removable waste collector adapted for use with a workpiece trimmer power tool for collecting waste material generated by the tool in use, the waste collector comprising a base portion with a collection opening therein, securing means by which the waste collector can be selectively and releasably secured to the tool in either of two positions relative to the tool, and a collection tube communicating with the opening in the base.

16. A removable waste collector according to claim 15, wherein the tube and the base together define an open channel at a portion where the tube meets the base.

17. A removable waste collector according to claim 15, wherein the channel has an open end at an edge of the base.

* * * * *